No. 875,524.  
PATENTED DEC. 31, 1907.  
G. O. HELVIG.  
STOVEPIPE FASTENER.  
APPLICATION FILED JULY 16, 1907.
2 SHEETS—SHEET 1.
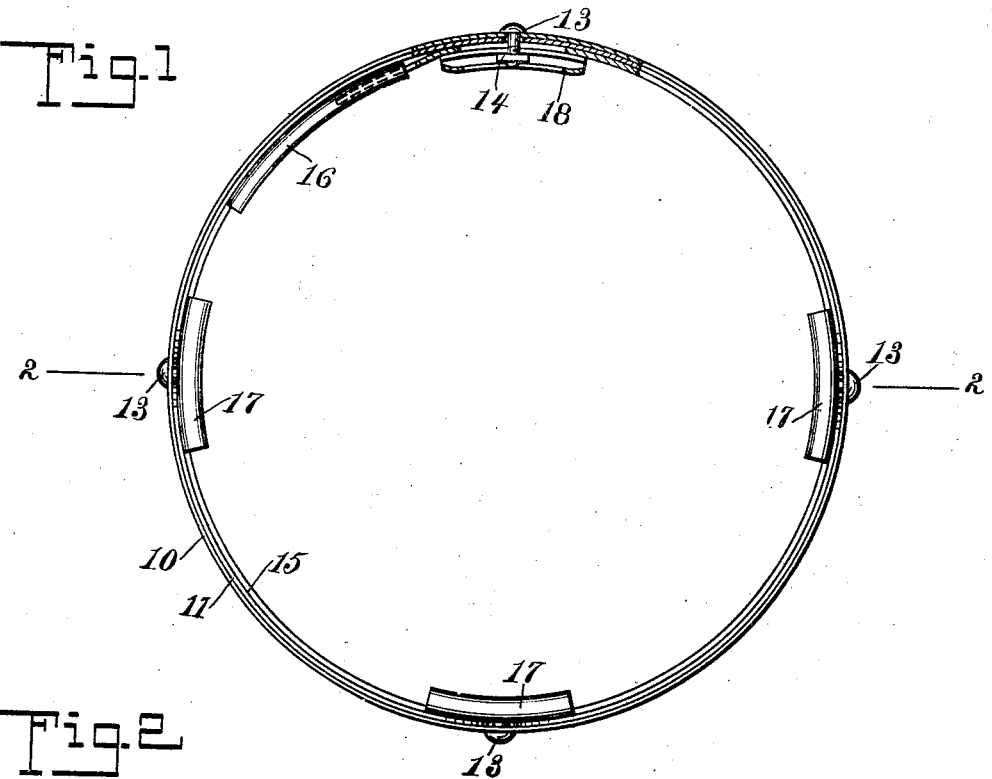
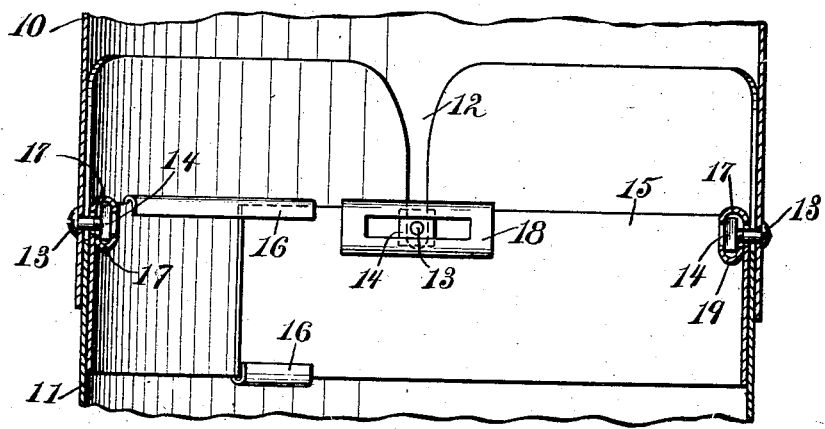
WITNESSES  
J. A. Brophy  
C. W. Fairbank
INVENTOR  
Gilbert O. Helvig  
BY Munn & Co  
ATTORNEYS No. 875,524. PATENTED DEC. 31, 1907.
G. O. HELVIG.
STOVEPIPE FASTENER.
APPLICATION FILED JULY 16, 1907.
2 SHEETS—SHEET 2.
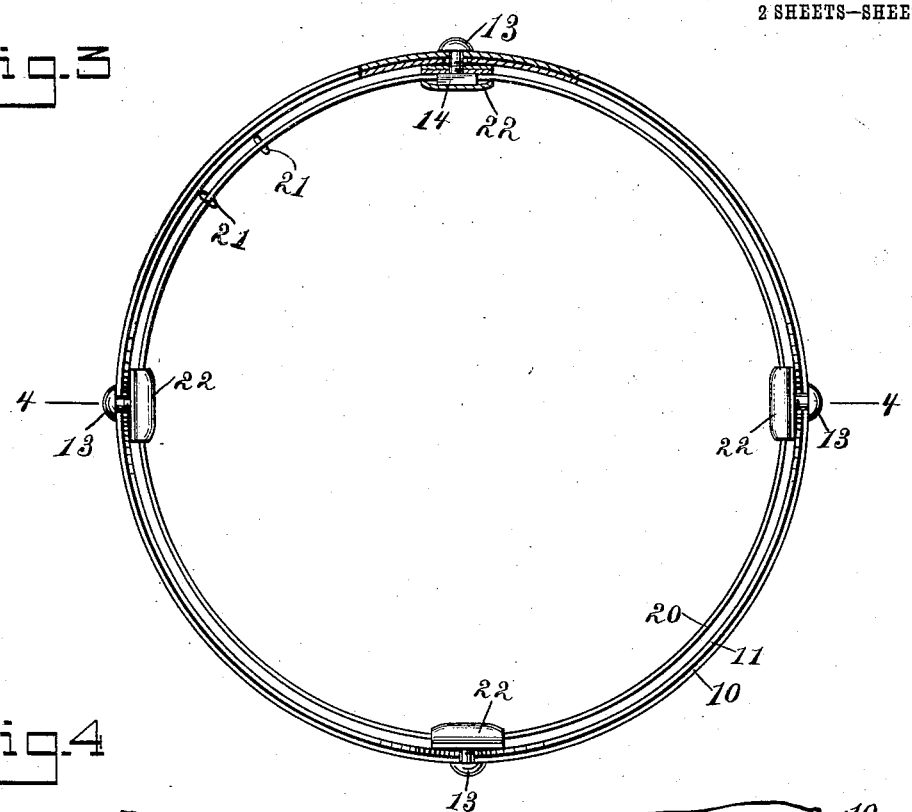
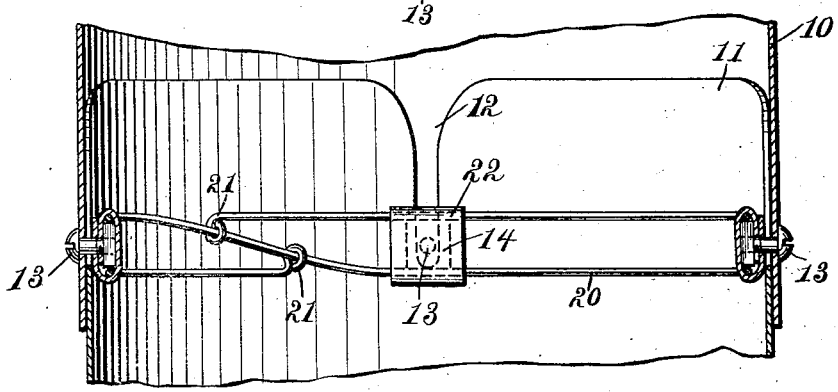
WITNESSES
J. A. Brophy
C. W. Fairbank
INVENTOR
Gilbert O. Helvig
BY Munn & Co.
ATTORNEYS

UNITED STATES PATENT OFFICE.

GILBERT O. HELVIG, OF DAWSON, MINNESOTA.

STOVEPIPE-FASTENER.

No. 875,524.   Specification of Letters Patent.   Patented Dec. 31, 1907.

Application filed July 16, 1907. Serial No. 383,963.

*To all whom it may concern:*

Be it known that I, GILBERT O. HELVIG, a citizen of the United States, and a resident of Dawson, in the county of Lac qui Parle and State of Minnesota, have invented a new and Improved Stovepipe-Fastener, of which the following is a full, clear, and exact description.

This invention relates to means for securing together the adjacent ends of pipe sections, and is particularly adapted for use in connection with stove and other pipes of a similar nature formed of sheet metal.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in all the figures, and in which Figure 1 is an end view of two pipe sections provided with securing means constructed in accordance with my invention; Fig. 2 is a central longitudinal section taken on the line 2—2 of Fig. 1; Fig. 3 is a view similar to Fig. 1, but showing a different form of construction; and Fig. 4 is a central longitudinal section taken on the line 4—4 of Fig. 3.

My improved fastening means is adaptable for use in securing together the ends of pipe sections, particularly stove pipes and other pipes formed of sheet metal. and is of such a nature that it may be readily employed in connection with pipes already manufactured, as it does not involve any specific construction of the pipe other than the providing of one of the pipe sections with longitudinally-disposed slots extending inwardly from the end a short distance.

In the drawings I have illustrated two pipe sections 10 and 11 having their ends telescoping, the pipe 11 being illustrated as extending into the end of the pipe 10. One of the pipes is provided with longitudinal slots, and from a structural standpoint it is entirely immaterial whether this be the outer or the inner pipe, but to improve the appearance of the construction it is preferable that the slotted pipe extend into the unslotted pipe. As illustrated, the slots 12 are in the inner pipe 11.

For securing the pipes together I provide a plurality of bolts 13, each extending through an aperture in the wall of the outer pipe and through one of the slots of the inner pipe. The bolts are held from longitudinal movement by their engagement in the apertures, and the inner pipe is permitted to slide longitudinally to the desired point by the engagement of the bolts in the slots. Upon the inner end of each bolt there is provided a nut 14, and means are provided for preventing the rotation of these nuts. This means preferably comprises an extensible annular ring within the inner pipe and having guideways for holding the nuts. In the construction illustrated in Figs. 1 and 2, this extensible ring takes the form of a band 15 of sheet metal having one end thereof provided with inwardly-curved flanges 16 to act as a retainer for the opposite end and permit of an expansion and contraction of the ring. At points along the length of the ring corresponding to the apertures in the outer pipe and to the slots 12 in the inner pipe, there are provided a plurality of slots extending at right angles to the slots 12 and through which the bolts 13 may extend. Adjacent each of these openings the wall of the ring is provided with a flange preferably integral therewith and having a portion 17 bent outwardly to a distance substantially equal to the thickness of the nut, and then bent parallel to the body of the band to form a retaining portion 18 adjacent the outer surface of the nut. The edge 19 of the flange may be bent toward the band, if desired. Each of the flanges serves to form a guideway for the nut disposed therein and positively prevents the rotation of said nut. Each nut is preferably longitudinally movable within its guideway to accommodate for the expansion and contraction of the ring, but, if desired, the nuts may be rigidly secured within the guideways and the bolts inserted only after the ring has been expanded in place and the nuts brought to the proper alinement with the bolt openings in the outer pipe section.

In the form illustrated in Figs. 3 and 4, instead of providing a sheet metal band, the extensible annular member is formed of wire and upon this wire are mounted the guides or retainers for the nuts. As illustrated, the ring is formed of a single wire 20, adjacent the inner surface of the pipe 11 and extending twice around the circumference thereof. Each end of the wire is provided with a loop 21 encircling the portion to the wire adjacent thereto, whereby upon varying the distance between the loops the ring may be made larger or smaller. The two courses of the wire are preferably spaced a short distance apart and the retainers 22 are formed of sheet metal inclosing both courses of the wire and holding them apart a distance substantially equal to the width of the nut. The retainers are preferably longitudinally movable along the wire to bring them into proper alinement with the bolts. There is no necessity for longitudinal movement of the nuts in respect to the retainers, and said nuts are therefore preferably soldered or otherwise rigidly secured within said retainers.

In assembling the device, the inner ring is placed within the end of the outer pipe section and collapsed, so as to be spaced a short distance therefrom, the bolts are inserted and turned into the nuts by the use of a screwdriver, and the inner pipe 11 is then moved longitudinally between the outer pipe and the inner ring until the two pipes are telescoped to the desired extent, such telescoping being permitted by the entry of the bolts into the slots 12. The bolts are then tightened and the nuts drawn outwardly to expand the ring and draw the same into firm engagement with the inner surface of the inner pipe and to bind this pipe into firm engagement with the outer one. The slots 12 may be of any desired length dependent upon the extent to which it is desired that the pipes be telescoped, and in the form illustrated in Figs. 1 and 2, the extensible ring may extend longitudinally a suitable distance beyond the end of the outer pipe 10, whereby if the two pipes are not telescoped a sufficient extent to bring the ends of the slots 12 into the pipe 10, the ring will cover the slots upon their inner surface.

Having thus described my invention, I claim as new and desire to secure by Letters Patent:

1. The combination with two pipe sections having telescoping ends, of an extensible ring within the pipe sections, and a plurality of bolts extending through the walls of both pipe sections and through said ring.

2. The combination with two pipe sections having telescoping ends, of an extensible ring within the pipe sections, a nut non-rotatably held by said ring and a bolt extending through the wall of both pipe sections and into said nut.

3. The combination with two pipe sections having telescoping ends, of bolts extending through the adjacent walls of both sections, nuts at the inner ends of said bolts, and a ring for preventing the rotation of said nuts.

4. The combination with two pipe sections, one of which is provided with a plurality of longitudinally disposed slots adjacent the end thereof and said end telescoping with the end of the other section, of bolts extending through the outer section and through said slots in the inner section, and a ring in engagement with the inner ends of said bolts said ring and bolts serving to hold the pipe sections together.

5. A fastener for sheet metal pipes, comprising an extensible ring adapted to be disposed within the inner of two pipes adjacent their telescoping ends, nuts non-rotatably held by said ring, and bolts adapted for insertion through the walls of both pipes and into engagement with said nuts.

In testimony whereof I have signed my name to this specification in the presence of two subscribing witnesses.

GILBERT O. HELVIG.

Witnesses:
A. W. EWING,
A. J. PETERSON.